United States Patent [19]

Thorsell

[11] Patent Number: 4,467,685
[45] Date of Patent: Aug. 28, 1984

[54] GUARD SYSTEM FOR TRUSS COMPONENT CUTTING APPARATUS

[75] Inventor: Roland H. Thorsell, Corvallis, Oreg.

[73] Assignee: Excor, Inc., Corvallis, Oreg.

[21] Appl. No.: 486,912

[22] Filed: Apr. 20, 1983

[51] Int. Cl.³ .................... B27B 5/29; B27G 19/02
[52] U.S. Cl. .................... 83/478; 74/509; 83/546; 144/251 R
[58] Field of Search .............. 83/544–546, 83/425.3, 425.2, 425.4, 396–398, 404.1, 581, 433, 432; 144/251 R, 251 A, 251 B; 74/608–617

[56] References Cited

U.S. PATENT DOCUMENTS 3,380,494 4/1968 Mayo .................... 83/404.1

FOREIGN PATENT DOCUMENTS 852552 11/1980 U.S.S.R. .................... 83/478

*Primary Examiner*—James M. Meister
*Attorney, Agent, or Firm*—D. Paul Weaver

[57] ABSTRACT

A guarding system for the protection of workers at least at the workpiece discharge side of a truss lumber component cutting apparatus is disclosed. Guard sections are attached to and move with movable elements of the cutting apparatus in both horizontal and vertical directions of movement in relation to a lower stationary guard section. As a result, a restricted opening only is formed by the guarding system at the workpiece discharge side of the apparatus so that a worker can receive cut wooden components with comparative safety.

10 Claims, 6 Drawing Figures

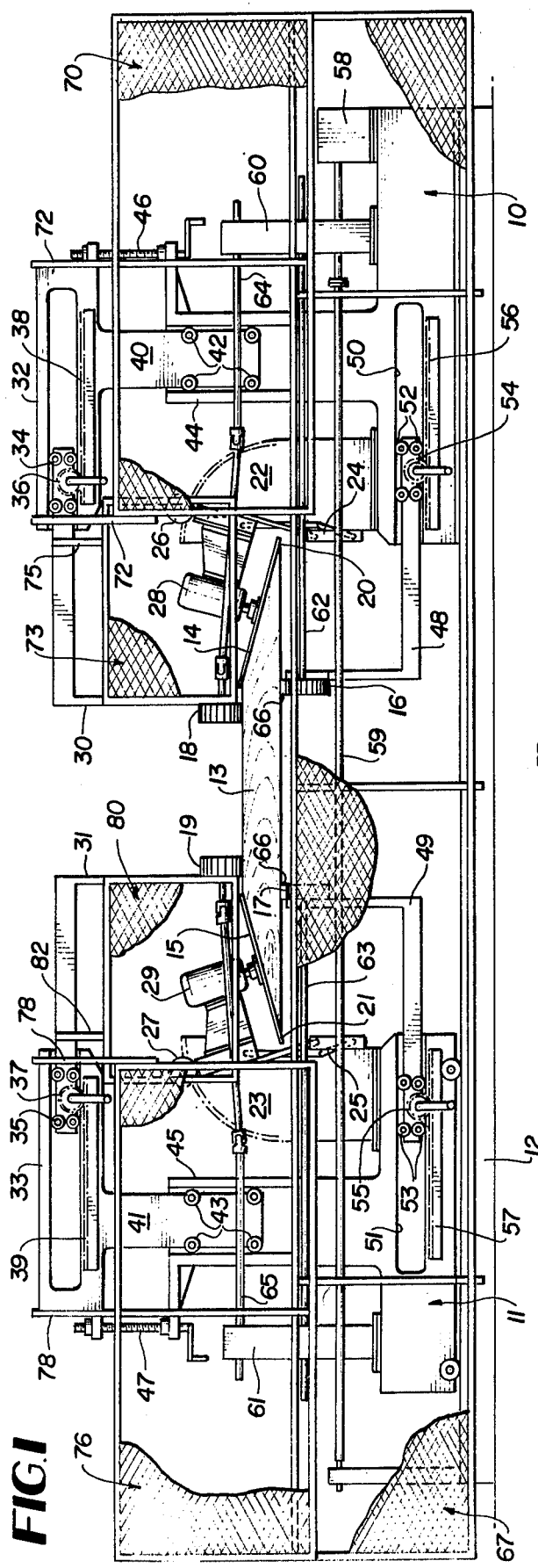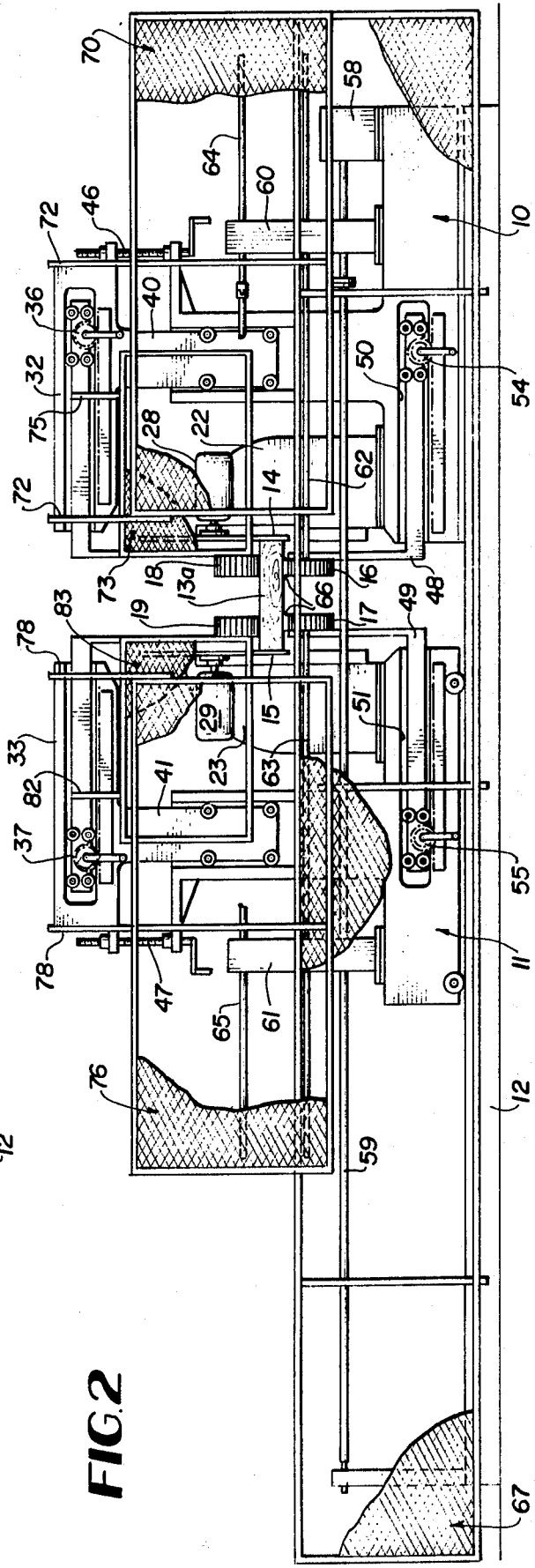

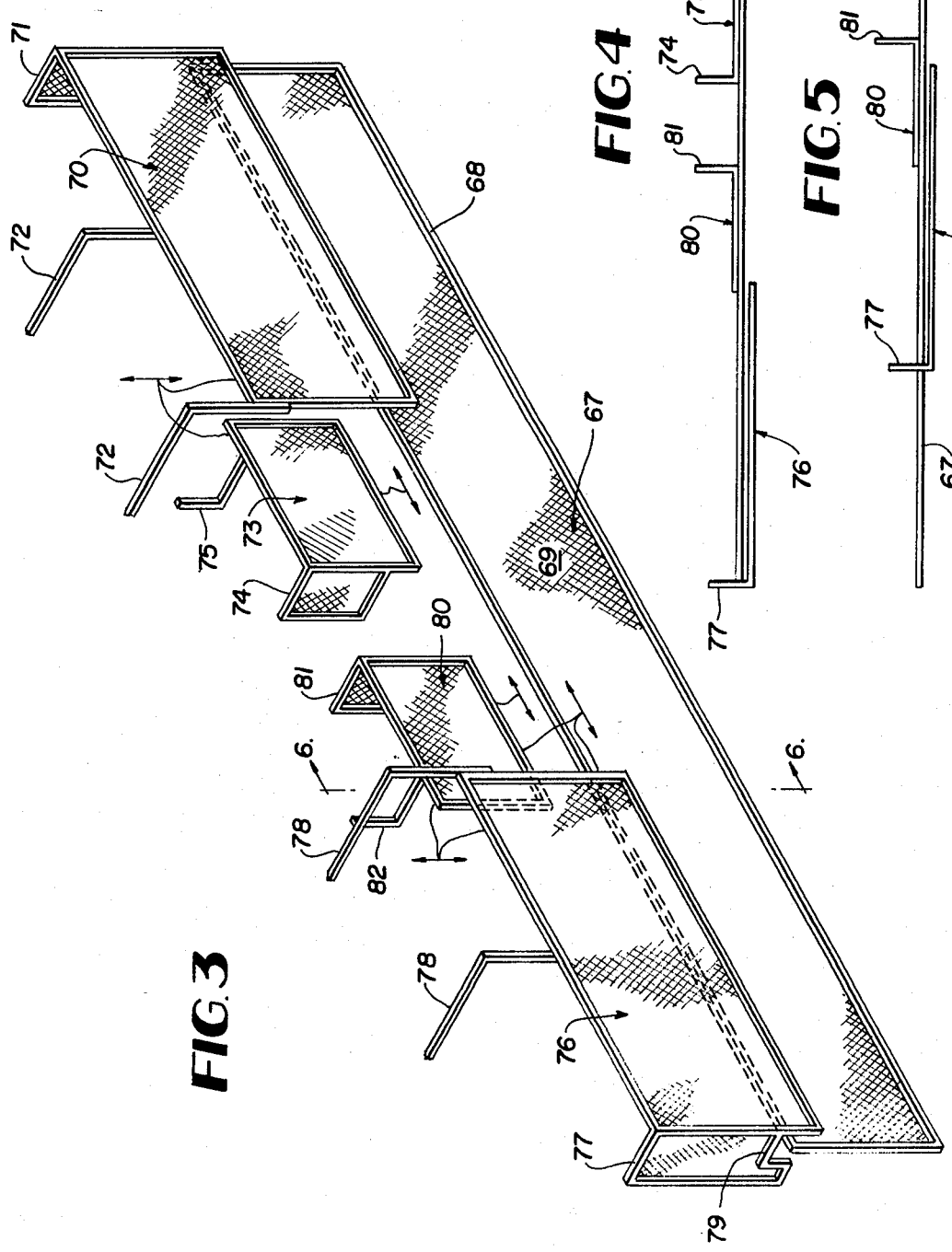

GUARD SYSTEM FOR TRUSS COMPONENT CUTTING APPARATUS

BACKGROUND OF THE INVENTION

The general objective of this invention is to provide a safety guard system for a truss lumber component cutting apparatus of the class shown in U.S. Pat. No. 4,277,998. In that patent and in several others referenced therein, a production machine for cutting wood components for prefabricated trusses and the like is disclosed. In the machine, during the cutting procedure, lumber pieces are moved through a plurality of relatively stationary circular saw blades by a lumber conveyor. The saw blades are individually mounted so that they can be angularly positioned through a wide range to produce various angle cuts on the ends of lumber components. One gang of saw blades is held on a stationary support system while a second laterally opposing gang is held on a movable support system which can be moved toward and from the stationary support system. The distance between the stationary and movable support systems determines the lengths of lumber components being cut.

A pair of conveyors is mounted on each support system to move the lumber sections through the rotating saw blades at a uniform speed with the longitudinal axis of each lumber piece held perpendicular to its path of movement through the saw blade. To achieve this relationship, the conveyors on the two support systems are synchronously driven.

Because any rotating machinery presents a potential hazard to nearby workers, a guarding system according to the present invention has been devised including guard sections which adjust automatically with variations in the length and thickness of workpieces being produced. As a result of this arrangement, only a small ungarded opening is created at the discharge side of the apparatus.

Other features and advantages of the invention will become apparent during the course of the following detailed description.

BRIEF DESCRIPTION OF THE DRAWINGS

FIG. 1 is a front elevation of a truss lumber component cutting apparatus equipped with a guard system in accordance with the present invention and depicting one working position of the guard system and cutting apparatus relative to one truss component.

FIG. 2 is a similar view of the apparatus and guard system in a second working position relative to another truss component of lesser length and thickness.

FIG. 3 is a perspective view of the guard system isolated from the cutting apparatus.

FIGS. 4 and 5 are partly diagrammatic plan views of the guard system as shown in FIG. 1 and FIG. 2, respectively.

FIG. 6 is a transverse vertical section taken on line 6—6 of FIG. 3.

DETAILED DESCRIPTION

Referring to the drawings in detail wherein like numerals designate like parts, a fixed support system 10 and a cooperative opposing movable support system 11 are mounted on a stationary base 12 of the cutting apparatus. A workpiece 13 or 13a, FIGS. 1 and 2, such as wooden truss components, is moved through rotary saw blades 14 and 15 of the apparatus by lower conveyors 16 and 17 on the respective support systems 10 and 11. The workpiece 13 or 13a undergoing cutting is also clamped at its top face by upper conveyors 18 and 19 of the respective stationary and movable support systems, substantially as disclosed in the above-referenced prior patent. The conveyors of the two support systems 10 and 11 are driven in synchronism to maintain the longitudinal axis of the workpiece being cut perpendicular to its path of movement though the apparatus. The required length of the workpiece 13 or 13a, or any other workpiece within the adjustment range of the apparatus, determines the lateral spacing of the lower conveyors 16 and 17 from two horizontal pivot axes 20 and 21 lying on the front faces of saw blades 14 and 15, around which the two saw blades pivot precisely to establish the required angle of cut, without changing the required length of a given workpiece. The lateral spacing of the two upper conveyors 18 and 19 is determined primarily by the cutting angles of the saw blades 14 and 15.

Gear sectors 22 and 23 are fixed, respectively, on support systems 10 and 11 and mount, respectively, pantograph linkages 24 and 25, FIG. 1. Driving pinions 26 and 27 propel the pantograph linkages around arcuate paths defined by the gear sectors 22 and 23 carrying attached saw blade motors 28 and 29 with the pantograph linkages, thereby causing the saw blades 14 and 15 to pivot on the horizontal axes 20 and 21 lying on their forward faces. This construction and mode of operation is substantially in accordance with the teachings in prior U.S. Pat. No. 4,277,998, above-referenced. When the saw blades 14 and 15 are positioned vertically with their forward faces parallel, FIG. 2, the upper workpiece clamping conveyors 18 and 19 can be positioned more closely to the respective axes 20 and 21. The upper conveyors 18 and 19 are attached to L-shaped support brackets 30 and 31. The brackets 30 and 31 move in opposing relationship horizontally on horizontal guideways 32 and 33 having constraining engagement with carriage rollers 34 and 35 of the two brackets. The two brackets 30 and 31 are propelled in opposite directions on the guideways 32 and 33 by manually turned pinion gears 36 and 37 having engagement with horizontal rack bars 38 and 39.

The rack bars 38 and 39 are fixed to the tops of vertically movable supports 40 and 41 which are engaged through roller means 42 and 43 with vertical guideways 44 and 45 rising from the fixed and moveable support systems 10 and 11. The respective vertically movable supports 40 and 41 are raised and lowered by the operation of manual screw shafts 46 and 47. Thus, the two upper workpiece clamping conveyors 18 and 19 are individually adjustable on their primary supports 10 and 11, both horizontally and vertically. Also, the entire movable support system 11 can travel on the base 12 horizontally toward and away from the stationary support system 10.

Brackets 48 and 49 on support systems 10 and 11 carry the lower workpiece conveyors 16 and 17. These brackets are held in horizontal guideways 50 and 51 and have carriage rollers 52 and 53 engaged with the guideways on the support systems 10 and 11. The two brackets 48 and 49 are propelled in opposite directions on their guideways 50 and 51 by manually operated pinions 54 and 55 which mesh with rack bars 56 and 57 on the respective support systems 10 and 11. Thus, it may be seen that the lower workpiece conveyors 16 and 17 are independently laterally adjustable one relative to the other and the lower conveyor 17 is also bodily movable with the movable support system 11.

A drive motor 58 on the stationary support system 10 directly drives a main elongated horizontal drive shaft 59, and through chain gear housings 60 and 61 also drives two lower conveyor drive shafts 62 and 63 as well as two upper conveyor drive shafts 64 and 65. The gearing in housings 60 and 61 imparts the proper directions of rotation to shafts 62, 63, 64 and 65, whereby the tops of the lower conveyors 16 and 17 and the bottoms of the upper conveyors 18 and 19 move in the same direction to convey workpiece 13, 13a, etc. from the infeed side of the apparatus to the output or delivery side shown in the drawings where the guard system, forming the main subject matter of this invention, is installed to protect the attendant who removes finished workpieces from forwardly projecting support extensions 66 on which the finished workpieces can accumulate a safe distance forwardly of the cutting saw blades.

The guard system proper for the apparatus shown isolated in FIG. 3 comprises a lower stationary horizontally elongated guard section 67 spanning the entire discharge side of the apparatus and being suitably fixed to the base 12. As shown in the drawings, the guard section 67 and all associated guard sections, yet to be described, consists of a rigid perimeter frame 68 and an expanded metal, wire mesh or chain link panel 69 within the perimeter frame. The lower stationary guard section 67 rises vertically from the base 12 to a sufficient height to guard the drive shafts 59, 62 and 63, as shown in FIGS. 1 and 2.

Another guard section 70 having an end right angular extension 71 is attached by support arms 72 to the vertically movable support 40. The guard section 70 moves vertically with the support structure 40 relative to the lower fixed guard 67 and overlaps the guard section 67 somewhat even when the guard section 70 is in the maximum elevated position. Thus, there will be no gap between these two guard sections during the operation of the apparatus. The guard section 70, as shown in the drawings, is spaced slightly forwardly of the lower fixed guard section 67.

As the support 40 is raised and lowered to provide proper clamping of various sizes of workpieces by the upper conveyors 18 and 19 during the operation of the apparatus, the guard section 70 forms a continuous barrier between the attendant or operator and the upper conveyor drive shaft 64 and associated elements. The left end of guard section 70, as viewed in the drawings, is positioned to allow sufficient clearance for the wooden workpieces 13, 13a, etc. to pass through the apparatus to the delivery side of the same.

A smaller guard section 73 having an interior right angular wing 74 is positioned behind the guard section 70 and somewhat above the top of lower guard section 67. The guard section 73 carries a support arm 75 which is fixed to the horizontally movable bracket 30 of the apparatus. The guard section 73 thus moves horizontally with the bracket 30 relative to the guard section 70 but does not move vertically. The various directional arrows in FIG. 3 depict the paths of movements of the various sections of the guard system. In addition to the support afforded by the arm 75, guard section 73 may also be attached directly at other points to the bracket 30. The guard section 73 forms a barrier between the operator and the upper conveyor drive shaft 64 and associated elements. There is never a gap between the adjacent vertical ends of guard sections 70 and 73 even when the guard section 73 is moved horizontally with the bracket 30 to its innermost position, FIG. 1. As shown, there will always be some overlapping of the vertical end portions of these two guard sections.

In a similar manner, adjacent to the movable support system 11 of the apparatus, a horizontally and vertically moving guard section 76, similar to the guard section 70, and having an end right angular wing 77 is attached by support arms 78 to the vertically movable support 41. The guard section 76 moves vertically during the operation of the apparatus with the support 41 and also moves horizontally with the movable support system 11. The guard section 76 overlaps the forward face of lower guard section 67 and is notched as at 79 to allow relative horizontal movement. Even when the guard section 76 is at the point of maximum elevation there is no gap between it and the top edge of the lower guard section 67.

A final guard section 80, similar to guard section 73, includes an inner end right angular wing 81 in opposing relationship to the wing or extension 74. The guard section 80 is attached directly and by means of a support arm 82 to the horizontally moving bracket 31. Thus, as shown by the arrows in FIG. 3, the guard section 80 is horizontally and vertically movable relative to the other guard sections of the system. The two guard sections 76 and 80 form barriers between the operator and conveyor shaft 65 and associated elements. The guard section 80 is behind the guard section 76 and above the top of lower guard section 67. There is never any gap between the adjacent vertical ends of guard sections 80 and 76 even when the former is in the innermost horizontal position toward guard section 73, FIG. 1.

All of the guard sections coact on the cutting apparatus to protect the operator from contact with rotating machinery parts and to greatly minimize the risk to the operator of being struck by material thrown by the rotating saw blades. As shown in FIGS. 1, 2 and 3, the relatively movable guard sections of the system in all of their working positions define a minimum safe passageway for the finished workpieces 13, 13a, etc. having various lengths, thicknesses and angled end faces.

FIGS. 2 and 5 illustrate the relative positions of the several sections of the guarding system as when a shorter, less thick truss components 13a having squared ends produced by parallel vertical saw blades 14 and 15 is being delivered. In this situation, the guard sections 73 and 80 are more closely spaced at their inner ends and are much more completely interleaved with guard sections 70 and 76. The movable support system 11 is also moved to a more closely spaced position relative to stationary support system 10.

From the above description, it is believed that the construction, mode of operation and protective function of the guarding system will now be understood by those skilled in the art without the necessity for any further description herein. The guarding system is characterized by simplicity and ruggedness and requires little or no attention after proper installation on the machine. Its movements to various protective positions are automatic in response to the described movements of the apparatus components, substantially in accordance with the referenced patent.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a guard system for a lumber component cutting machine of the class which includes a stationary support system and a movable support system for gangs of cutting saws through which lumber pieces are conveyed, and said support systems each having vertically and horizontally moving support means for a pair of upper synchronized lumber component conveyors and also having horizontally moving support means for lower lumber component conveyors, said guard system comprising a fixed horizontally elongated lower guard section adapted for securement to a base for the apparatus and being vertical and rising to an elevation near the tops of said lower conveyors, a pair of vertically movable guard sections spaced forwardly of the lower guard section and being vertically movable relative to the lower guard section and overlapping the top edge of the lower guard section in all operative positions, means attaching said pair of guard sections to the vertically moving support means of said support systems, and another pair of horizontally and vertically movable guard sections spaced rearwardly of the first-named pair and somewhat above the top edge of the lower guard section, said another pair of guard sections having overlapped relationship with the guard sections of the first-named pair in all operative positions, and means attaching said another pair of guard sections to said horizontally moving support means.

2. In a guard system for a lumber component cutting machine as defined in claim 1, and one of said pair of vertically movable guard sections also being horizontally movable relative to the fixed lower guard section with said movable support system, all of said guard sections forming the guard system cooperating to define a discharge opening for finished lumber components of varying lengths and thicknesses at the discharge side of the machine, whereby an operator of the machine may receive the finished lumber components with comparative safety from a machine support surface on which the lumber components accumulate.

3. In a guard system for a lumber component cutting machine as defined in claim 2, and each guard section of the guard system comprising a rigid perimeter frame and a foraminous panel held within said frame.

4. In a guard system for a lumber component cutting machine as defined in claim 1, and the guard sections of the first-named pair each having outer end comparatively short right angular extensions, and the guard sections of said another pair each having inner end right angular extensions thereon.

5. In the guard system for a lumber component cutting machine as defined in claim 4, and the first and second-named means attaching guard sections to the vertically moving and horizontally moving support means comprising support arms carried by the tops of the guard sections of said pairs and extending rearwardly therefrom.

6. In a guard system for a lumber component cutting machine as defined in claim 1, and each guard section of the guard system being substantially rectangular, flat and panel-like, and the guard sections being disposed in closely adjacent parallel vertical planes during use.

7. A guard system for a machine having vertically and horizontally adjustable components and rotating parts possessing the capability of causing injury to a machine operator, said guard system comprising a stationary vertical horizontally elongated lower guard section substantially spanning one side of the machine, and first and second pairs of coacting movable guard sections connected to vertically and horizontally moving parts of the machine to move with such parts relative to the lower stationary guard section and relative to one another, one pair of guard sections overlapping the upper edge portion of the lower guard section, and the other pair of guard sections being in overlapping relationship to interior end portions of said one pair of guard sections, whereby a machine operator is barred from contact with moving machine parts except through a centrally located restricted passage defined by all of the guard sections of the guard system, and said restricted passage being adjustable in its size through relative movements of the guard sections of said system.

8. A guard system as defined in claim 7, and all of said guard sections comprising flat panel-like sections lying in closely adjacent parallel vertical planes during usage.

9. A guard system as defined in claim 7, and support arms for the guard sections of the first and second pairs and being attachable to said vertically and horizontally moving parts of the machine, said support arms being fixed to the guard sections of the first and second pairs.

10. A guard system as defined in claim 9, and outer end substantially right angular extensions on the guard sections of the first pair, and inner end substantially right angular extensions on the guard sections of the second pair.

* * * * *